United States Patent Office 2,911,308
Patented Nov. 3, 1959

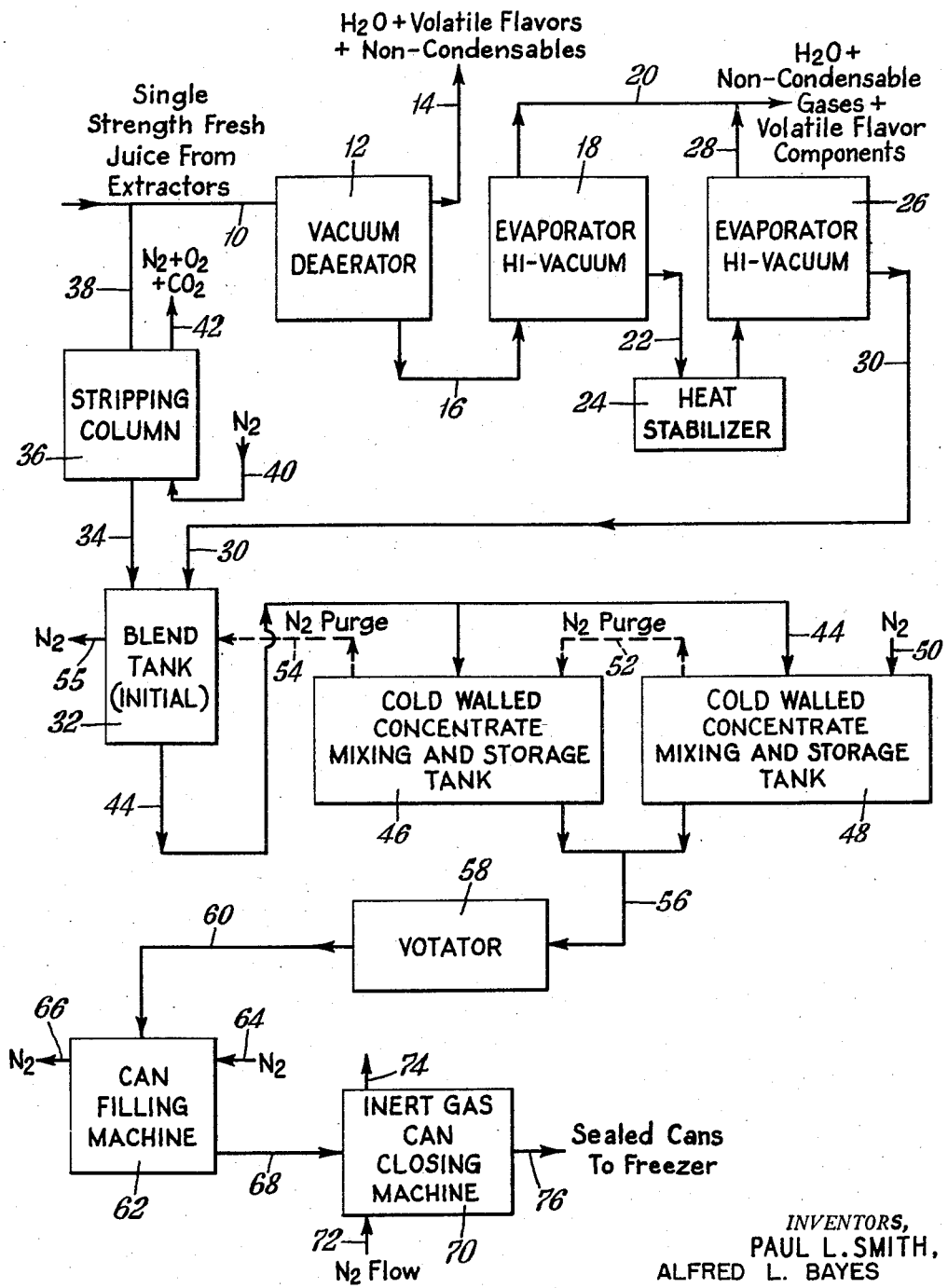

2,911,308

CONCENTRATED FRUIT JUICE AND METHOD

Paul L. Smith, New York, and Alfred L. Bayes, Kenmore, N.Y., assignors to Union Carbide Corporation, a corporation of New York Application August 6, 1957, Serial No. 676,546

5 Claims. (Cl. 99—186)

This invention relates to concentrated fruit juices and methods of producing the same.

In the concentration of fruit juices by removing water, the juices are subjected to evaporation which in addition to the water, removes non-condensable gases such as oxygen and carbon dioxide, and also volatile flavor components. While the bulk of the valuable food content of the juice is retained, the loss of flavor is a sales deterrent, and it has been proposed to cut back a proportion of natural or unconcentrated juice to restore flavor components. It has been found that a small proportion of such cut back juice is adequate to supply a marketable flavor.

In the process of extraction the natural juice has become aerated, and the cut back juice restores oxygen to the concentrate, which detracts from its storage withstanding qualities.

It is therefore the main object of the present invention to remove the oxygen from the cut back juice supplied to restore the flavor quality to the evaporated juice.

According to the present invention the oxygen is removed from the cut back juice by subjecting the same to a stripping operation by an inert gas such as nitrogen, prior to the blending with the concentrate. Preferably the blend is protected from pick up of oxygen in subsequent operation by a purging operation of the head space with inert gas. Other inert gases may be employed such as argon and helium. Carbon dioxide may also be used in cases where a carbonated flavor is not objectionable.

In the drawing the single figure is a flow sheet of the juice from the extractors to the sealed cans.

Fresh single strength juice from the extractors and at ambient temperatures is supplied by a line 10. This juice contains for example 0.40 cc. oxygen and 3.2 cc. carbon dioxide per 100 grams of juice. The line 10 supplies the juice to a vacuum deaerator 12 which operates normally at a temperature of between 50 and 55° F.

From an exhaust line 14, water, non-condensable gases and volatile flavor components are taken off, and the residue containing for example 0.03 cc. oxygen and 0.30 cc. carbon dioxide per 100 grams of juice, passes through a line 16 to a high vacuum evaporator 18.

From an exhaust line 20 water, non-condensables and volatile flavors are taken off, and in the form shown, the residue passes through a line 22 to a heat stabilizer 24, and on to a second stage high vacuum evaporator 26. An exhaust line 28 joins the line 20 to take off the same kind of vapors. The residue of approximately 50 to 55% Brix concentrate is free of any oxygen or carbon dioxide, and passes through a line 30.

The line 30 delivers the concentrate to a blend tank 32, which also receives cut back juice through a line 34 from a stripping column 36. The column 36 receives single strength fresh juice from the extractors through a branch 38 from the main feed line 10.

Into the bottom of this stripping column 36 nitrogen gas is fed through a line 40 at for example 30 cubic feet per one thousand gallons of juice. This nitrogen removes oxygen and carbon dioxide from the cut back juice, the stripping nitrogen and entrained oxygen and carbon dioxide being all discharged through an exhaust line 42.

The nitrogen stripped cut back juice from the stripping column 36, passing through the line 34 to the blend tank 32, contains for example residual 0.02 cc. oxygen and 0.40 cc. carbon dioxide per 100 grams of juice. Being blended with the concentrate from the line 30 which is essentially free of oxygen and carbon dioxide, the blended product contains for example 0.01 cc. oxygen and 0.08 cc. carbon dioxide per 100 grams of blend, which blend is drawn off through a line 44.

The line 44 conducts the blend to cold walled concentrate mixing and storage tanks 46 and 48 having preferably less than 1% oxygen head space. Nitrogen purge at for example 50 cubic feet per hour is supplied by a line 50 to the tank 48 and passes through a line 52 to the tank 46 and on through a line 54 to the blend tank 32, from which the nitrogen purge and its entrainments are exhausted through a line 55.

The concentrate from the tanks 46 and 48 passes through a line 56 to a heater exchanger or votator 58, wherein it is further cooled, and on through a line 60 to a can filling machine 62 in which the concentrate is protected by nitrogen supplied by line 64 and exhausted by line 66. From the can filling machine the filled cans pass by conveyor 68 to the can closing machine 70, in which the concentrate is protected by nitrogen supplied by a line 72 and exhausted through a line 74.

From the can closing machine 70 the sealed cans pass to a freezer as at 76. The resultant head space contains for example oxygen 0.5 to 1.5%, nitrogen 98.5 to 99.5%. The juice analysis is for example oxygen 0.01 cc. and carbon dioxide 0.08 cc. per 100 grams.

What is claimed is:

1. A process for the preparation of a concentrated fruit juice which comprises separating juice from fruit, concentrating a portion of said fruit juice by the removal therefrom of water, subjecting a second portion of said fruit juice to a stripping operation wherein an inert gas is passed through said juice so as to preferentially displace at least a portion of oxygen present in said juice, protecting said concentrated portion of juice from contamination with oxygen by maintaining it in a non-oxidizing atmosphere, protecting said second portion of fruit juice which has been subjected to said stripping operation from contamination by maintaining it in a non-oxidizing atmosphere, combining said first and second portions of said fruit juice and placing said combined portions in a sealed container.

2. A process for the preparation of a concentrated orange juice which comprises separating juice from fruit, concentrating a portion of said orange juice by the removal therefrom of water, subjecting a second portion of said orange juice to a stripping operation wherein an inert gas is passed through said juice so as to preferentially displace at least a portion of oxygen present in said juice, protecting said concentrated portion of juice from contamination with oxygen by maintaining it in a non-oxidizing atmosphere, protecting said second portion of orange juice which has been subjected to said stripping operation from contamination by maintaining it in a non-oxidizing atmosphere, combining said first and second portions of said orange juice and placing said combined portions in a sealed container.

3. A process for the preparation of a concentrated orange juice which comprises separating juice from fruit, concentrating a portion of said orange juice by evaporating water from said portion of said orange juice while subjecting said juice to a pressure less than atmospheric, subjecting a second portion of said orange juice to a stripping operation wherein an inert gas is passed through said juice so as to preferentially displace at least a portion of oxygen present in said juice, protecting said concentrated portion of juice from contamination with oxygen by maintaining it in a non-oxidizing atmosphere, protecting said second portion of orange juice which has been subjected to said stripping operation from contamination by maintaining it in a non-oxidizing atmosphere, combining said first and second portions of said orange juice and placing said combined portions in a sealed container.

4. A process for the preparation of a concentrated orange juice which comprises separating juice from fruit, concentrating a portion of said orange juice by evaporating water from said portion of said orange juice while subjecting said juice to a pressure less than atmospheric, subjecting a second portion of said orange juice to a stripping operation wherein nitrogen is passed through said juice so as to preferentially displace at least a portion of oxygen present in said juice, protecting said concentrated portion of juice from contamination with oxygen by maintaining it in a non-oxidizing atmosphere, protecting said second portion of orange juice which has been subjected to said stripping operation from contamination by maintaining it in a non-oxidizing atmosphere, combining said first and second portions of said orange juice and placing said combined portions in a sealed container.

5. A process for the preparation of a concentrated orange juice which comprises separating juice from fruit, concentrating a portion of said orange juice by evaporating water from said portion of said orange juice while subjecting said juice to a pressure less than atmospheric, subjecting a second portion of said orange juice to a stripping operation wherein nitrogen is passed through said juice so as to preferentially displace at least a portion of oxygen present in said juice, protecting said concentrated portion of juice from contamination with oxygen by maintaining it in a non-oxidizing atmosphere, protecting said second portion of orange juice which has been subjected to said stripping operation from contamination by maintaining it in a non-oxidizing atmosphere, combining said first and second portions of said orange juice and placing said combined portions in a sealed container while continuing the protection of said juice by maintaining it in a non-oxidizing atmosphere.

References Cited in the file of this patent

UNITED STATES PATENTS

| | | |
|---|---|---|
| 2,047,935 | Beal et al. | July 21, 1936 |
| 2,301,901 | McKinnis | Nov. 10, 1942 |
| 2,333,898 | Stevenson et al. | Nov. 9, 1943 |
| 2,453,109 | MacDowell et al. | Nov. 9, 1948 |
| 2,457,315 | Milleville | Dec. 28, 1948 |